R. NIELSEN.
ICE CREAM SPOON.
APPLICATION FILED JULY 15, 1908.
1,132,870.
Patented Mar. 23, 1915.
2 SHEETS—SHEET 1.
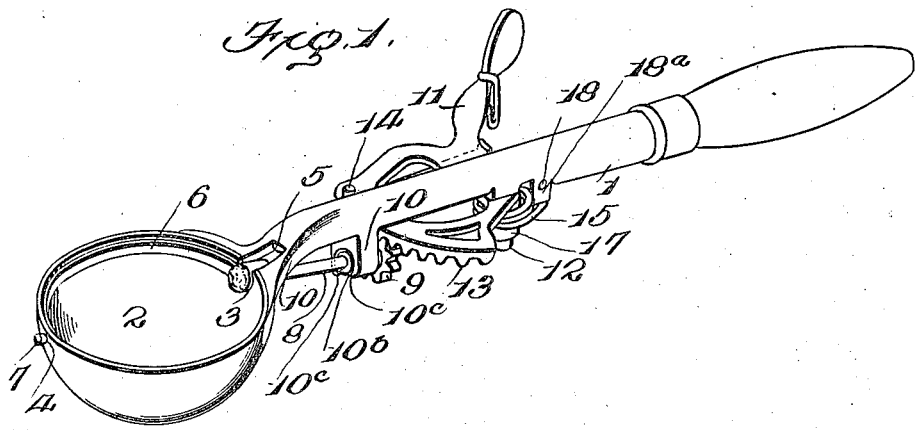
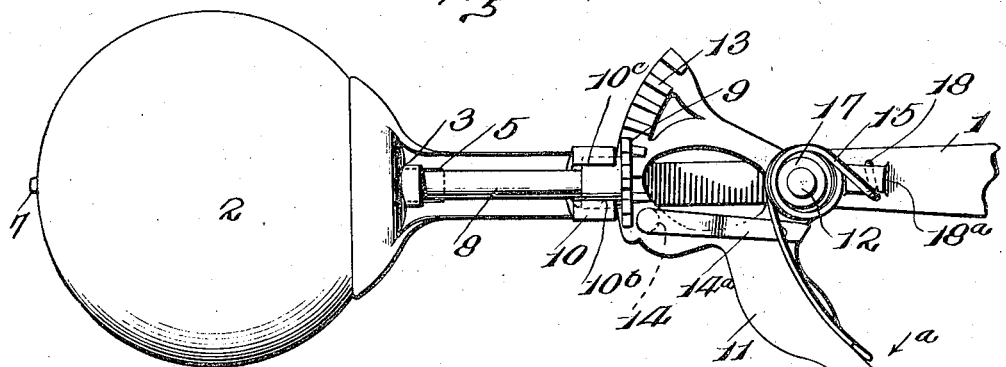
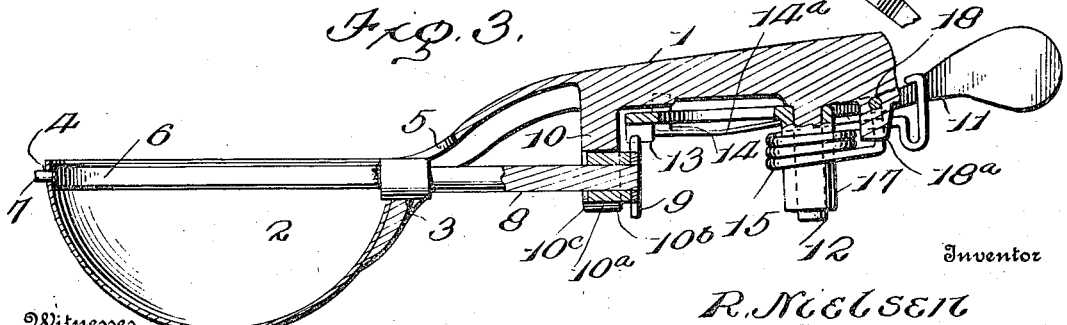
Witnesses
Roy Williams
F. E. Ballard
Inventor
R. Nielsen
By
Attorney

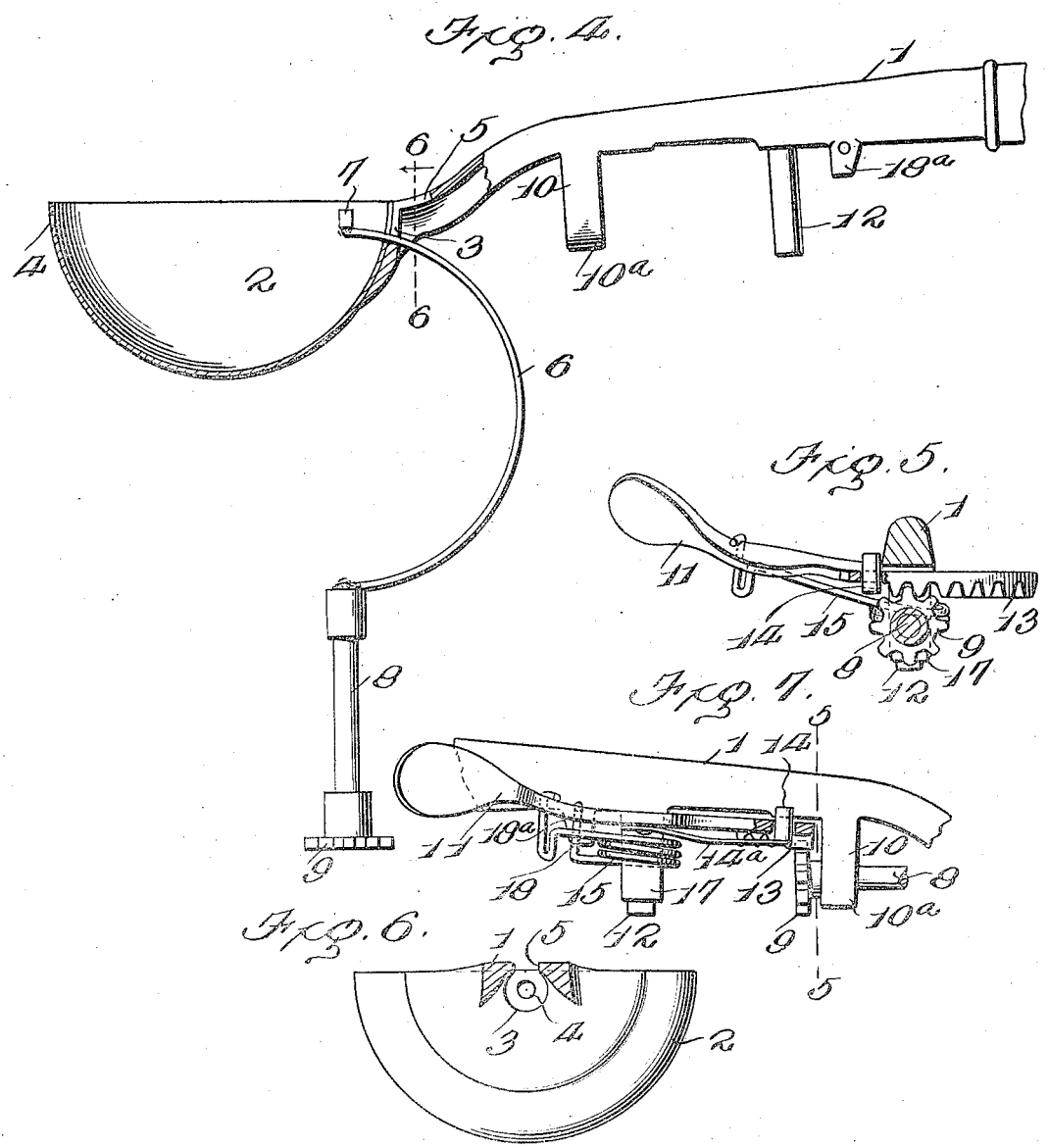

UNITED STATES PATENT OFFICE.

RASMUS NIELSEN, OF TROY, NEW YORK, ASSIGNOR TO THE GILCHRIST COMPANY, OF NEWARK, NEW JERSEY, A CORPORATION OF NEW JERSEY.

ICE-CREAM SPOON.

1,132,870.  Specification of Letters Patent.  Patented Mar. 23, 1915.

Application filed July 15, 1908. Serial No. 443,706.

*To all whom it may concern:*

Be it known that I, RASMUS NIELSEN, citizen of the United States, residing at Troy, in the county of Rensselaer and State of New York, have invented certain new and useful Improvements in Ice-Cream Spoons, of which the following is a specification.

This invention relates to improvements in ice cream spoons.

The prime object of the invention is to provide a spoon structure which may be readily taken to pieces for cleaning, to avoid particles of cream gathering and eventually becoming sour.

According to my invention, I provide a spring adapted to be attached and detached, holding the ordinary finger piece to the handle, which in turn holds the scraper and its coöperating parts in assembled position.

Other objects and advantages will be hereinafter referred to and particularly pointed out in the claims.

In the drawings—Figure 1 is a perspective view of my improved spoon. Fig. 2 is a bottom plan view of the same. Fig. 3 is a vertical central section. Fig. 4 is a view similar to Fig. 3, but showing the scraper being removed. Fig. 5, is a section on line 5—5 Fig. 7. Fig. 6 is a detail cross section on the line 6—6, Fig. 4. Fig. 7 is a detail side elevation part being in section.

1, indicates a handle, having at one end a bowl 2. An elongated bearing 3, is formed at the junction of the handle and bowl, and in line with it in the bowl is a second bearing 4. The bearing 3, is a very essential feature of my present invention, as it enables me to conveniently remove the scraper from the bowl. Communicating with the bearing is a slot 5, somewhat narrower than the bearing proper, as clearly shown in Fig. 6, whereby the spindle of the scraper is retained in the bearing.

Supported in the bearings 3, and 4, is a scraper 6, having a trunnion 7, and shaft or spindle 8. The scraper fits snugly within the bowl and is adapted to be partially revolved therein to remove the cream, as will be readily understood. The trunnion 7, engages bearing 4, while the shaft or spindle 8, fits in the bearing 3. On the free end of shaft 8, is a gear wheel 9, which by reason of the offset 10, in the handle is under the latter. Depending from the handle is a lug $10^a$, formed with a bearing $10^b$, having retaining means, such as inturned lugs $10^c$, to hold the spindle in position.

A finger piece 11, is pivoted on a post 12, extending from the handle, and it is provided at one end with a finger grip, and at its opposite end with a series of teeth 13, which engage the pinion 9. Adjacent the one end of the row of teeth is a spring stop 14, to limit the movement of the finger piece in one direction. One end of a spring 15, is slipped over the finger piece, and is then coiled around a boss 17, also on the finger piece, and the free end is bent to form a hook 18, to engage an eye formed in a lug $18^a$ on the handle.

The spring stop 14, is mounted on a leaf spring $14^a$ secured to the finger piece, and which normally tends to project the stop in the path of the handle to limit the movement of the scraper. This construction affords a convenient means for quickly assembling the parts, or taking them to pieces as will be explained farther on. When assembled, the hooked end 18, of the spring, engages the eye of lug $18^a$, and the opposite end engages the finger piece which places said spring under tension, and thereby throws the finger piece in direction of arrow $a$, Fig. 2, and brings the spring stop 14, against the handle. By pressing the finger grip toward the handle, the spring is compressed and the scraper is moved in the usual manner in the bowl, and when released assumes normal position as shown in Fig. 1.

When it is desired to take the spoon to pieces to clean it, the spring stop 14, is forced out of the plane of the finger piece, and the spring 15, will cause the teeth to become disengaged from the pinion. The pinion being now free the scraper is turned upwardly as shown in dotted lines in Fig. 4, and is moved toward the handle to remove the shaft 8, from its bearings, and is then turned so as to withdraw the scraper proper through the slot 5, as shown in full lines in Fig. 4. The parts being now separated they may be conveniently cleaned, and again put in place by reversing the movement just described.

The spring performs a dual function, to wit: holds the parts together, and serves as a means for operating the scraper in one direction. When the finger piece is turned in one direction by the operator, the spring returns it to normal position.

What I claim is:

1. An ice cream spoon comprising a bowl and handle, the bowl having an opening and in alinement therewith an open bearing, an end bearing on the handle, a scraper having a trunnion which fits in the opening in the bowl, and a spindle which fits in the open bearing and also the end bearing on the handle, means including two inwardly projecting flanges on the bowl adjacent to and coöperating with the open bearing to retain the spindle in said bearing, and means for turning the scraper in the bowl.

2. An ice cream spoon comprising a bowl and handle, the bowl having two bearings, one of which is open at the top, an end bearing extending from the handle, a scraper operating in the bowl and having a trunnion and spindle, the trunnion and spindle operating in the bearings, means including two inwardly projecting flanges adjacent the open bearing located to permit movement of the trunnion in direction of the handle to disengage it from its bearing, whereby the scraper may be removed from the bowl, and means for operating the scraper.

3. An ice cream spoon comprising a bowl and handle, a scraper in the bowl, a pinion connected to the scraper, a finger piece having teeth which mesh with the pinion, a spring for operating the finger piece in one direction, a movable stopping device mounted on the finger piece to abut against the handle to limit the movement of said finger piece, and a yielding element for normally projecting the stopping device in the path of movement of the finger piece.

4. An ice cream spoon comprising a bowl and handle, a scraper in the bowl, a pinion connected to the scraper, a finger piece having teeth which mesh with the pinion, a spring for operating the finger piece in one direction and a spring actuated stop carried by the finger piece to limit the movement of the latter.

5. An ice cream spoon comprising a bowl and handle, a scraper in the bowl, a pinion connected to the scraper, a finger piece having teeth which mesh with the pinion, a spring for operating the finger piece in one direction, and a stop in the path of the handle carried by the finger piece to limit the movement of the latter, and a yielding element for normally projecting the stopping device in the path of movement of the finger piece.

6. An ice cream spoon comprising a bowl and handle, a scraper in the bowl, a pinion connected to the scraper, a finger piece having teeth which mesh with the pinion, a spring for operating the finger piece in one direction, a stop on the finger piece which is located in the path of the handle to limit the movement of said finger piece, and a spring acting on the stop to normally force it out.

7. In an ice cream disher, the combination of a bowl, an undercut open-sided bearing, a scraper movable within the bowl, a shaft connected to the scraper to control its movements and journaled in said bearing, said shaft being reduced in diameter adjacent said bearing to a degree sufficient to make it removable from the bearing by successive longitudinal and lateral movements, the reduced portions of the shaft passing laterally through the bearing opening, and means to control the rotation of the shaft.

8. An ice cream spoon comprising a bowl having bearings, a handle extending from the bowl, a lug spaced from the bowl and extending from the handle and formed with a bearing in alinement with the bearings in the bowl, a scraper in the bowl, a spindle extending from the scraper and operating in the bearing in the lug, a pinion on the spindle, a laterally movable rack engaging the pinion, movable means operable against the handle and movable with the rack to limit the movement of the scraper in one direction, and a spring tensioned to cause the movable means to normally come against the handle.

9. An ice cream spoon comprising a bowl having bearings, a handle extending from the bowl, a lug spaced from the bowl and extending from the handle and formed with a bearing in alinement with the bearings in the bowl, a scraper in the bowl, a spindle extending from the scraper and operating in the bearing in the lug, a pinion on the spindle, a laterally movable rack engaging the pinion, movable means for maintaining the rack in mesh with the pinion, and a spring for operating the rack in one direction.

10. An ice cream spoon comprising a bowl and handle, the bowl having a restricted bearing, a bearing on the handle spaced from the restricted bearing and in alinement with the latter, a scraper operating in the bowl, a spindle on the scraper, said spindle operating in the bearings, a pinion on the spindle, a rack pivoted on the handle and meshing with the pinion, a movable stop movable with the rack, to limit the movement of the latter in one direction, and a spring for operating the rack in one direction.

11. An ice cream spoon comprising a bowl and handle, a scraper in the bowl, means for removably holding the scraper in the bowl, means including a lever for operating the scraper in the bowl, a movable stop carried by and movable with the lever to limit the movement of the latter in one direction, the removal of said stop allowing said scraper to be positioned to be released by said scraper holding means.

12. An ice cream spoon comprising a bowl and handle, a scraper operating in the bowl, a spindle on the scraper, a bearing spaced from the bowl in which the spindle operates, a finger piece for operating the scraper, a spring coöperating with the scraper to rotate same in one direction, and a movable stop carried by the handle and operable against the handle to limit the movement of the scraper in the bowl against the tension of the spring.

13. An ice cream spoon comprising a bowl formed with bearings, one of which is open and restricted, a scraper operating in the bowl and provided with a trunnion, a spindle extending from the scraper, a fixed bearing on the handle and spaced from the bowl, the spindle operating in the restricted and fixed bearings, a pinion on the spindle, a finger operated rack engaging the pinion, and a movable stop carried by the finger piece to hold the pinion and rack in mesh, the removal of said stop permitting of separation of the pinion and rack and the scraper being removed through the fixed bearing.

14. An ice cream spoon comprising a bowl and handle, a scraper operating in the bowl, a spindle extending from the scraper, a bearing located below the handle to receive the spindle, a finger operating piece pivoted below the handle to rotate the spindle in the bearing, and a movable stop for limiting the movement of the finger piece to prevent disengagement of the finger operating piece and the spindle.

15. An ice cream spoon comprising a bowl and handle, a scraper operating in the bowl, a pinion operable with the scraper and located below the handle, means for removably holding the scraper in the bowl, a finger operating piece having a rack and located below the handle, a spring for operating the finger piece in one direction, and a movable stop mounted on and movable with the finger piece to maintain the pinion and rack in mesh, the removal of said stop allowing said scraper to be positioned to be released by said scraper holding means.

16. An ice cream spoon comprising a bowl and handle, a scraper and spindle, a restricted bearing for the spindle, an open bearing for the spindle, spaced from the restricted bearing and located under the handle, a pivoted finger piece under the bearing, and a movable stop carried by the finger piece to limit the movement of the latter in one position, the removal of the stop permitting removal of spindle from its bearings.

17. An ice cream spoon comprising a bowl and handle, the bowl having two bearings one of which is open and is provided with over-hanging portions, a scraper operating in the bowl and having a trunnion and spindle, the trunnion fitting in one of the bearings and the spindle fitting in the other, the overhanging portions holding the spindle in the bearing, a finger piece having teeth which engage the pinion, a locking connection between the finger piece and the handle, the bearing formed with the overhanging portions permitting of the withdrawing of the trunnion from its bearing when the locking connection is released.

18. In an ice cream disher, the combination of a bowl, a handle, a scraper operable in and removable from the bowl, a lever pivoted to the handle and operatively connected to and for rotating the scraper, a spring for shifting the lever in one direction, stop means for arresting the lever in normal position and against movement in the spring pressed direction, said stop means being operable to release the scraper for additional movement in the spring pressed direction while the lever remains in connection with the handle, and means for removably holding the scraper in the bowl, the scraper being rendered removable by the additional movement in the spring pressed direction.

19. In an ice cream disher, the combination of a bowl, a handle on the bowl, a scraper rotatable in and removable from the bowl, a lever for rotating the scraper, pivoted to the handle, means having fixed relation to the bowl and precluding removal of the scraper from the bowl during the normal operation of the lever and permitting withdrawal of the scraper from the bowl when the scraper is rotated to a certain abnormal position relatively to the bowl and while the lever remains in connected relation to the handle, a spring for shifting the scraper in one direction, and stop means for arresting the movement of the scraper in the spring pressed direction, said stop means being operable to permit additional movement of the lever in the spring pressed direction and to permit the spring to shift the scraper into said abnormal position.

20. In an ice cream disher, the combination of a bowl, a handle on the bowl, a scraper rotatable in and removable from the bowl, scraper actuating mechanism comprising a lever, a rack and a pinion, a spring for operating said mechanism in one direction, means for removably holding the scraper in the bowl, and stop means for arresting the movement of the scraper in the spring pressed direction and in normal position, said stop means being operable to permit additional movement of the scraper in the spring pressed direction to permit the pinion and rack to be separated by such additional movement.

In testimony whereof I affix my signature in presence of two witnesses.

RASMUS NIELSEN.

Witnesses:
L. H. GILES,
NELS NIELSEN.